US005493154A

United States Patent [19]
Smith et al.

[11] Patent Number: 5,493,154
[45] Date of Patent: Feb. 20, 1996

[54] TEMPERATURE SHARE SCHEME

[75] Inventors: David A. Smith, Kowloon; Neal G. Stewart; Carl E. Arvidsson, both of Hong Kong, all of Hong Kong

[73] Assignee: Astec International, Ltd., Hong Kong, Hong Kong

[21] Appl. No.: 51,046

[22] Filed: Apr. 21, 1993

[51] Int. Cl.$^6$ .................................................. H02H 7/127
[52] U.S. Cl. .............................. 307/43; 363/54; 307/117; 307/58; 323/907
[58] Field of Search ............................ 307/45, 82, 117, 307/151, 52, 53, 55, 58, 43, 310; 323/272, 245, 907; 363/54, 65, 71, 74

[56] References Cited

U.S. PATENT DOCUMENTS 5,099,409  3/1992  Bando et al. ........................... 363/54

Primary Examiner—William M. Shoop, Jr.
Assistant Examiner—Peter Ganjoo
Attorney, Agent, or Firm—Coudert Brothers

[57] ABSTRACT

An improved temperature control system for a power conversion circuit having two or more power converters operating in parallel and providing output power to a single load. The temperature control system maintains the temperature of each of these power converters at approximately the average temperature of the power converters. A detector coupled to each power converter detects the temperature of the power converter and generates a measurement signal that is a function thereof. A reference signal is generated that is a function of each measurement signal. A control circuit responsive to the measurement signal of each power converter adjusts the output power of that respective converter as a function of the difference between that converter's measurement signal and the reference signal such that the temperature of each power converter approximates the average of temperature of the power converters.

4 Claims, 2 Drawing Sheets

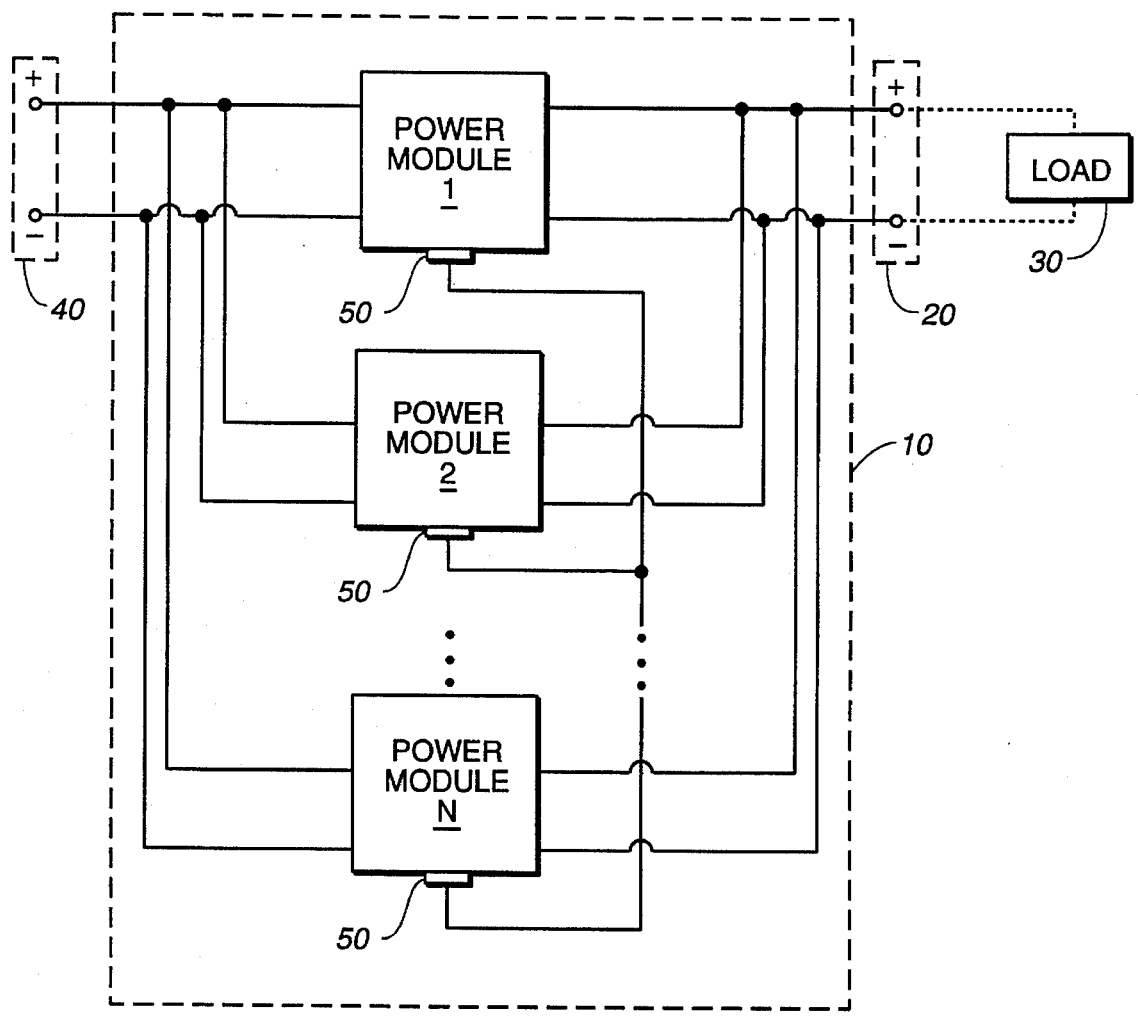
FIG._1

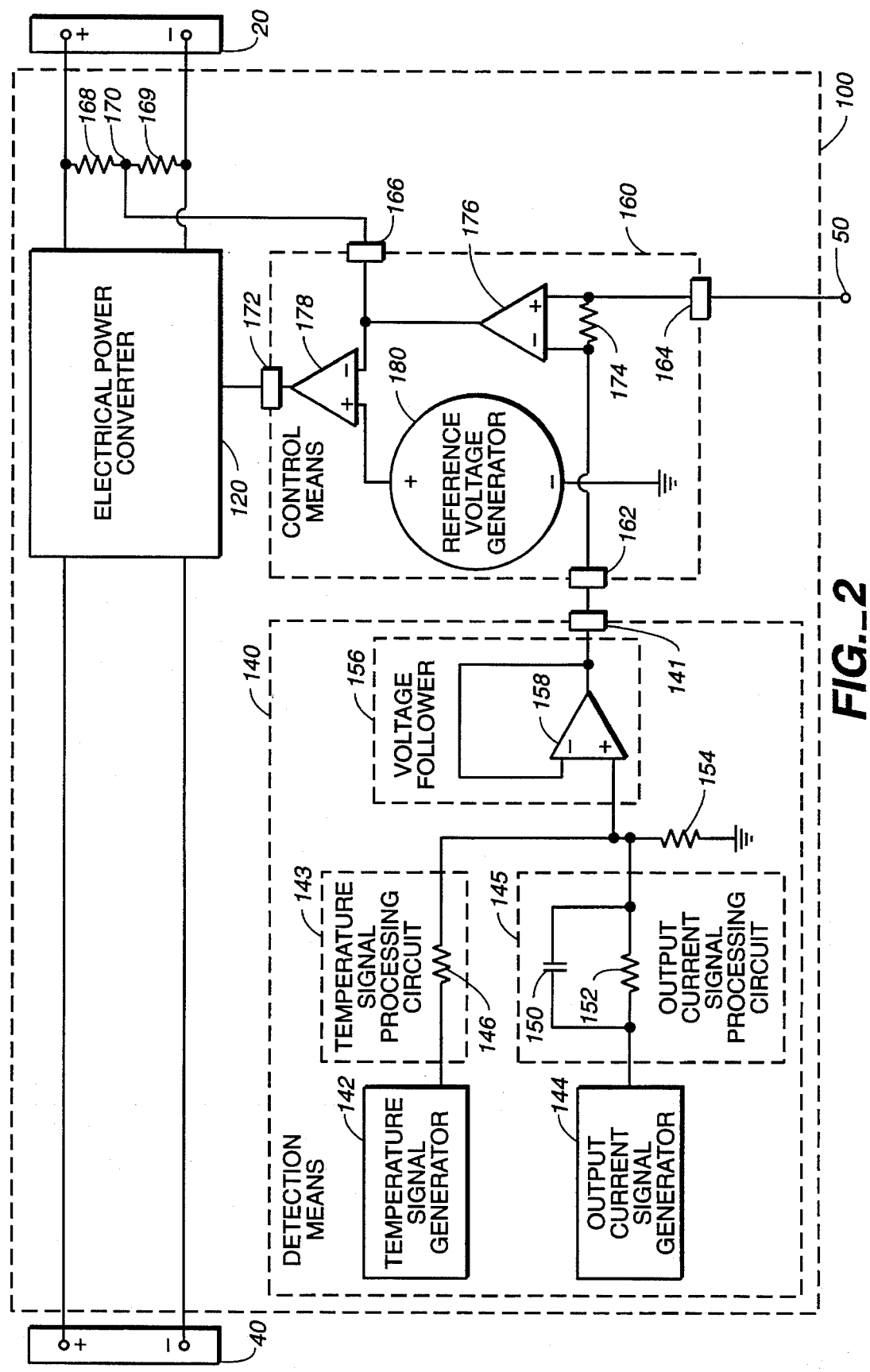
FIG._2

TEMPERATURE SHARE SCHEME

FIELD OF THE INVENTION

The present invention relates to temperature control circuits for electrical power converters, and more particularly to temperature control circuits for electrical power converters that are coupled in parallel to supply power to a single load.

BACKGROUND OF THE INVENTION

A wide variety of electrical power converters are available to convert electrical power that is in one form, such as an AC supply, into another from, such as one or more DC voltages. The efficient performance of an electrical power converter depends on many factors, including the operating temperature of the converter. Excessive operating temperatures can lead to a number of problems with the performance of a power converter. For example, excessive temperatures can result in the power converter having a shorter lifetime or an increased likelihood of "thermal shutdown." In practice, the mean-time-between-failure ("MTBF") of a power converter is roughly proportional to the exponential of the temperature at which the converter is operated.

Power converters commonly are coupled in parallel to provide increased power to a single load. In such cases, it is difficult to control the temperature of each power converter within the parallel system. For example, where a number of power converters are cooled by a fan, a temperature gradient may develop which causes the power converters relatively far from the fan to operate at a higher temperature. It is also possible that, due to the particular circuit configuration, certain power converters may supply more power to the load than other power converters. This imbalance in power provided to the load can result in a temperature variation in the converters because the temperature of a power converter is related to the power dissipated in that converter, which is a function of the power provided by the converter.

To assist in regulating the temperature of a parallel system of power converters, control circuits for balancing the power supplied by each power converter to the load may be used. In one type of control circuit, each converter compares its own output current with the average output current of all converters in the system and changes its output voltage such that its output power approximates the average output power of the converter. The problem with this approach is that the temperature of one or more power converters may still rise to a level that will reduce the MTBF of the converter and/or bring it into thermal shutdown as a result of temperature imbalances that are caused by factors other than the imbalance in power supplied to the load.

Accordingly, there is a need for temperature share scheme for controlling the temperatures of power converters operating in parallel to increase the MTBF of the power converters and reduce the risk of thermal shutdown.

SUMMARY OF THE INVENTION

The present invention recognizes that the temperatures of power converters operating in parallel can be controlled by using control circuitry that compares the temperature of each converter to the average temperature of the converters and adjusts the temperatures of the converters so that each converter more closely approximates the average temperature of the converters.

Broadly stated, the present invention is a temperature share scheme for use in a circuit wherein two or more power converters are coupled in parallel to provide output power to a single load, for maintaining the temperature of each power converter at approximately the average temperature of the power converters. The temperature share scheme comprises detection means, coupled to each power converter, for detecting the temperature of said power converter and for generating a measurement signal that is a function thereof; means for generating a reference signal that is a function of each said measurement signal; and control means, responsive to said reference signal, for adjusting the output power of each said power converter such that the temperature of each said power converter approximates the average temperature of the power converters, said control means including means responsive to the measurement signal of each said power converter for adjusting the output power of that respective converter as a function of the difference between said connected measurement signal and said reference signal.

In one embodiment of the present invention, the measurement signal generated by said detection means is further a function of the output current of each power converter coupled to said detection means such that no converter is required to provide a significantly higher percentage of the output power to said load than any other converter.

An object of the present invention is, therefore, to provide a temperature share scheme for power converters coupled in parallel to supply power to a single load that prevents temperature of any one power converter from substantially exceeding the average temperature of the system of power converters.

Another object of the present invention is to provide a temperature share scheme for a system of parallel power converters that prevents the converters from reaching temperatures that reduce their lifetime.

Still another object of the present invention is to increase the MTBF of a system of parallel power converters.

Yet another object of the present invention is to reduce the likelihood of thermal shutdown of any power converter in a system of parallel power converters supplying power to a load.

A further object of the present invention is to provide a temperature share scheme that controls the output power of each power converter in a system of parallel power converters as a function of both the output current of each converter and the temperature of each converter such that the temperature of each converter approximates the average temperature of the system of converters.

A still further object of the present invention is to provide a temperature share scheme that causes the temperature of each power converter in a system of parallel power converters to approximate the average temperature of the system over a relatively long time scale and also allows the power converters to respond equally to changes in the load's current demand.

These and other objects of the present invention will become apparent to those skilled in the art from the following detailed description of the invention and preferred embodiments, the accompanying drawings, and the appended claims.

BRIEF DESCRIPTION OF THE DRAWINGS

FIG. 1 is a block diagram of a system of parallel power modules supplying power to a load according to the present invention.

FIG. 2 is a combined block and circuit diagram of an embodiment of a power module comprising a power converter and a temperature share scheme according to the present invention.

DETAILED DESCRIPTION OF THE INVENTION AND PREFERRED EMBODIMENTS

The present invention is intended to be used with a circuit wherein two or more electrical power converters are coupled in parallel to provide output power to a single load. An exemplary power supply system comprising a number ("N") of parallel power modules, (each of which comprises at least one electrical power converter), coupled to a single output load is shown at 10 in FIG. 1.

As shown in FIG. 1, power module 1, power module 2, . . . power module N are each coupled to a single power output port 20 for supplying power to a load. An exemplary load 30 is shown coupled to output port 20 of system 10. In a preferred embodiment, power is supplied to power modules 1 through N at a single power input port 40. It will be recognized by those skilled in the art that it is not necessary for the present invention that power be supplied to power modules 1 through N at a single power input port. Rather, the power modules may receive power from a number of sources.

Each power module in system 10 has a temperature share terminal 50 and, as shown in FIG. 1, the temperature share terminals 50 of power modules 1 through N are all coupled to each other. As will be explained further below in connection with FIG. 2, temperature share terminals 50 allow for a temperature control circuit to compare the temperature of each power module to the average temperature of power modules 1 through N and to adjust the output power of each power module such that the temperature of each power module approximates the average temperature of power modules 1 through N.

In a preferred embodiment, each power module in system 10 comprises a conventional switch mode power converter whose output is regulated by a conventional pulse width modulator circuit. It may be appreciated, however, that the present invention will operate with power modules comprising other conventional types of power converters. It will be recognized by those skilled in the art that power modules 1 through N may each comprise a different type of power converter.

An embodiment of a power module for use within a system of parallel power modules such as system 10, is shown at 100 in FIG. 2. Power module 100 comprises power output port 20, power input port 40, and temperature share terminal 50, each of which was discussed in connection with FIG. 1.

Power module 100 also comprises an electrical power converter 120 connected between input port 40 and output port 20. In a preferred embodiment, electrical power converter 120 is a conventional switch mode power converter, having its output regulated by a conventional pulse width modulator.

Power module 100 also comprises detection means 140 for detecting the temperature of power module 100 and for generating a measurement signal that is a function thereof at detection means output port 141. As shown in FIG. 2, the measurement signal at port 141 is coupled to a control means 160, which is described below.

The measurement signal at port 141 is also coupled through control means 160 to temperature share terminal 50. As was shown in FIG. 1, temperature share terminal 50 of power module 100 is coupled to the temperature share terminals of each of the other power modules within the system 10. Thus, an electrical signal will be generated at temperature share terminal 50 as a function of the measurement signal provided by each power module which, in a preferred embodiment, are each identical to power module 100. The electrical signal at terminal 50 is used as a reference signal, explained further below.

Power module 100 also comprises control means 160 for adjusting the output power of power converter 120 such that the temperature of power module 100 approximates the average temperature of system 10. Control means 160 is responsive to the reference signal at temperature share terminal 50 and includes means responsive to the measurement signal provided by detection means 140 for adjusting the output power of electrical power converter 120 as a function of the difference between the measurement signal of detection means 140 and the reference signal at temperature share terminal 50.

It may be appreciated that the circuits in module 100 other than power converter 120 can be viewed, in combination with the other N–1 similar circuits of the remaining power modules, as a single temperature control circuit. More specifically, a system of N parallel power modules identical to power module 100, such as system 10, will comprise N detection means identical to detection means 140, N control means identical to control means 160, and N temperature share terminals 50, which terminals are all coupled together. In such a system, the set of N detection means collectively comprise a single detection means, coupled to each power converter, for detecting the temperature of said power converter and for generating a measurement signal that is a function thereof. The set of mutually coupled temperature share terminals 50 collectively comprise means for generating a reference signal that is a function of each said measurement signal. In certain embodiments, the reference signal is a function of the average temperature of the power converters in system 10. The set of N control means collectively comprise control means, responsive to said reference signal, for adjusting the output power of each said power converter such that the temperature of each said power converter approximates said average temperature of the power converters, said control means including means responsive to the measurement signal of each said power converter for adjusting the output power of that respective power converter as a function of the difference between that converter's connected measurement signal and said reference signal.

In some embodiments of the present invention, each individual power module may contain a separate detection means and control means as shown in FIG. 2. In accordance with the above discussion, however, it may be recognized that it is not necessary for each module to separately contain the circuits discussed above. Rather, such circuits may be viewed as a separate control temperature circuit for the system of N electrical power converters.

A general description for the functional blocks of power module 100 according to the present invention has thus far been given. The detailed circuits and operation of the present invention will be described below.

Detection means 140 of power module 100 comprises a signal generator 142 that detects the internal temperature of power module 100 and generates a signal that is a function thereof. Detection means 140 also preferably comprises a signal generator 144 which generates a signal that is a function of the output current provided by power module 100 to output port 20. Signal generators that perform the functions of signal generators 142 and 144 are available and well known in the art.

In one embodiment, the signal produced by signal generator 142 is coupled through resistor 146 to a node 148. The signal produced by signal generator 144 is coupled through a capacitor 150 and a resistor 152 coupled in parallel as shown in FIG. 2, to node 148. Node 148 is coupled through a resistor 154 to a ground reference potential. In this embodiment, resistor 146 comprises a first signal processing circuit 143, which provides an electrical current that is a function of the signal produced by signal generator 142. The parallel combination of capacitor 150 and resistor 152 collectively comprise a second signal processing circuit 145, which provides an electrical current that is a function of the signal produced by signal generator 144. The voltage at node 148 is, therefore, a function of the electrical currents provided by circuit 143 and 145. Accordingly, the voltage at node 148 is also a function of both the internal temperature of power module 100 and the output current of power module 100.

Capacitor 150 provides partial DC isolation between signal generator 144 and node 148. Thus, when generator 144 provides a predominately DC signal, the signal produced by generator 142, which is a function of the temperature of module 100, will be a greater factor in determining the value of the voltage at node 148. When the signal produced by generator 144 has a relatively large AC component, it will be a greater factor in determining the value of the voltage at node 148. As a result, the voltage at node 148 will preferably be predominately a function of the output current of module 100 when there is a large change in the output current, while preferably being predominately a function of the temperature of module 100 when the output current of module 100 is relatively stable. Thus, the capacitor allows for temperature sharing or equalizing long-term and current sharing short-term. It will be recognized by those skilled in the art that there are many alternative embodiments of processing circuits 143 and 145.

The purpose of resistor 152 is to assure that the voltage at node 148 is functionally related to the value of the output current of module 100 even when the output current is relatively stable, thereby preventing hotter modules when turning off and cooler modules from continuously delivering maximum current in order to equalize their temperatures. It will be appreciated by those skilled in the art that this allows the modules to respond more rapidly to load changes.

The voltage at node 148 is coupled through a conventional voltage follower 156, comprising a conventional operational amplifier 158, to output port 141 of detection means 140. Operational amplifier 58 includes a conventional feedback loop coupling its output to its input. The electrical signal at output 141, therefore, comprises a voltage that is a function both the internal temperature of power module 100 and the output current of power module 100.

It will be appreciated by those skilled in the art that, for purposes of the present invention, the signal at port 141 need only be a function of the internal temperature of power module 100. In such a case, only the circuit elements relating to signal generator 142 need be included in detection means 140. In a preferred embodiment, however, detection means 140 comprises the circuit elements shown in FIG. 2 so that the voltage at port 141 is a function of both the internal temperature of power module 100 and the output current of power module 100.

It will also be appreciated by those skilled in the art that, for purposes of the present invention, signal generator 142 can be used to measure the temperature at any point or points within power module 100. In a preferred embodiment, however, signal generator 142 is used to generate a signal that is a function, specifically, of the temperature of electrical power converter 120. As a practical matter, the temperature at any point in power module 100 will be functionally related to the temperature of power converter 120.

Control means 160 of power module 100 includes input port 162 which is coupled to port 141 of detection means 140, input port 164 which is coupled to temperature share terminal 50, and input port 166 for receiving a measure of the output voltage of electrical power converter 120. As shown in FIG. 2, the voltage provided to control means 160 at input port 166 is derived from a conventional voltage divider for measuring the output voltage of power module 100. The voltage divider comprises resistor 168, which is coupled between the positive terminal of output port 20 and a node 170, and resistor 169, which is coupled between the negative terminal of output port 20 and node 170. Node 170 is coupled directly to input port 166 of control means 160.

Control means 160 also includes output port 172 for providing a control signal to electrical power converter 120 for adjusting the output power of power converter 120. In a preferred embodiment, electrical power converter 120 is a conventional switch mode supply having a conventional pulse width modulator, and the output signal of control means 160 is used to control the pulse width modulator of power converter 120 in a conventional manner.

As shown in FIG. 2, a resistor 174 is coupled between input port 162 and input port 164. Input port 162 is further coupled to the negative input of a transconductance amplifier 176, and input port 164 is further coupled to the positive terminal of transconductance amplifier 176. Transconductance amplifier 176 generates an output signal that is a function of the difference in the voltage at its positive and negative inputs. In a preferred embodiment, the output current of transconductance amplifier 176 is approximately proportional to the voltage between its terminals. The output of transconductance amplifier 176 is coupled to input port 166.

In operation, transconductance amplifier 176 compares the voltage at input port 162, which is a function of the internal temperature and output current of power module 100, against the voltage at input port 164, which is a function of the average measurement signal produced by each detection means 140 in each of electrical power converters within system 10. The output signal produced by transconductance amplifier 176 is combined with the voltage measurement received at input port 166 to produce a voltage that is coupled to the negative input of amplifier 178, which is, preferably, a conventional error amplifier used in a conventional pulse width modulator. Although error amplifier 178 is shown in FIG. 2 as part of control means 160, it will be appreciated that amplifier 178 may simply be the error amplifier used in the conventional pulse width modulator within electrical power converter 120. Control means 160 further comprises a means 180 for producing a reference voltage. The reference voltage produced by means 180 is coupled to the positive terminal of amplifier 178, which compares this reference voltage against the voltage received at its negative terminal to produce a signal at output port 172 that is used to adjust the output voltage of electrical power converter 120 in a conventional manner.

While the present invention has been particularly described with respect to the illustrated embodiments, it will be appreciated that various alternations, modifications, and adaptations may be made based on the present disclosure, and are intended within the scope of the present invention. While the present invention has been described in connection with what is presently considered to be the most practical and preferred embodiments, it is to be understood that the present invention is not limited to the disclosed embodiments, but, to the contrary, is intended to cover various modifications and equivalent arrangements included within the scope of the appended claims.

What is claimed is:

1. In a circuit wherein two or more power converters are coupled in parallel to provide output power to a single load, a temperature control system for maintaining the temperature of each power converter at approximately the average temperature of the power converters, comprising:

detection means, coupled to each power converter, for detecting the temperature of said power converter and for generating a measurement signal that is a function thereof;

means for generating a reference signal that is a function of each said measurement signal; and control means, responsive to said reference signal, for adjusting the output power of each said power converter such that the temperature of each said power converter approximates the average temperature of the power converters, said control means including means responsive to the measurement signal of each said power converter for adjusting the output power of that respective converter as a function of the difference between said connected measurement signal and said reference signal.

2. The temperature control system of claim 1 wherein the measurement signal generated by said detection means is further a function of changes in the output current of each power converter coupled to said detection means such that no converter is required to provide a significantly higher percentage of the output power to said load than any other converter.

3. The temperature control system of claim 1, wherein the measurement signal generated by said detection means is further a function of the value of the output current of each power converter coupled to said detection means such that no power converter will provide a significantly greater amount of power to the load than any other said power converter.

4. The system of claim 1 wherein the reference signal is further a function of the average temperature of the power converters.

* * * * *